US007682066B2

(12) United States Patent
Inagaki (10) Patent No.: US 7,682,066 B2
(45) Date of Patent: Mar. 23, 2010

(54) METHOD FOR RECYCLING WASTE SULFURIC ACID (75) Inventor: Yasuhito Inagaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 812 days.

(21) Appl. No.: 10/536,347

(22) PCT Filed: Nov. 28, 2003

(86) PCT No.: PCT/JP03/15235

§ 371 (c)(1),
(2), (4) Date: Nov. 14, 2005

(87) PCT Pub. No.: WO2004/050553

PCT Pub. Date: Jun. 17, 2004

(65) Prior Publication Data
US 2006/0144446 A1    Jul. 6, 2006

(30) Foreign Application Priority Data
Dec. 2, 2002   (JP)   ............................. 2002-350372

(51) Int. Cl.
B01F 15/04 (2006.01)
G05D 11/08 (2006.01)
C01B 17/90 (2006.01)

(52) U.S. Cl. .................... 366/152.1; 366/136; 137/3; 137/93; 423/531; 423/DIG. 2

(58) Field of Classification Search .............. 366/152.4, 366/136, 137, 152.1, 160.1, 162.1, 172.1, 366/172.2; 137/5, 93, 3; 423/531, DIG. 2; 588/409
See application file for complete search history.

(56) References Cited

U.S. PATENT DOCUMENTS

| 2,900,176 | A | * | 8/1959 | Krogel ........................ 366/137 |
| 3,047,369 | A | * | 7/1962 | Montgomery ................ 422/164 |
| 3,738,815 | A | * | 6/1973 | Pawloski et al. ............. 422/132 |
| 3,743,484 | A | * | 7/1973 | Morimoto ...................... 23/306 |
| 3,830,473 | A | * | 8/1974 | Lieferman et al. ........... 366/136 |
| 3,885,587 | A | * | 5/1975 | Troope ........................ 137/391 |
| 4,483,357 | A | * | 11/1984 | Rao et al. |
| 4,518,261 | A | * | 5/1985 | Sekimoto et al. ......... 366/155.1 |
| 4,764,019 | A | * | 8/1988 | Kaminski et al. .............. 366/15 |

(Continued)

FOREIGN PATENT DOCUMENTS
EP    1568658 A1  *  8/2005

(Continued)

OTHER PUBLICATIONS
Japanese Office Action dated Nov. 21, 2007 for Japanese Application No. 2002-350372.

(Continued)

*Primary Examiner*—Charles E Cooley
(74) *Attorney, Agent, or Firm*—Rader, Fishman & Grauer PLLC (57) ABSTRACT The recycling apparatus of waste sulfuric acid for collecting waste sulfuric acid generated at a source site A, transporting it by a carrier B, and recycling it for reuse at a user site C, the recycling apparatus of waste sulfuric acid including a receiving tank for receiving virgin sulfuric acid (a) and waste sulfuric acid (b) having a concentration different from that of the virgin sulfuric acid, and including (1) a mixer alone, (2) a mixer and a concentration monitor, or a mixer and a cooler in combination, or (3) a mixer, a concentration monitor, and a cooler in combination.

9 Claims, 4 Drawing Sheets

U.S. PATENT DOCUMENTS

| | | | | |
|---|---|---|---|---|
| 4,955,723 | A * | 9/1990 | Schneider | 366/136 |
| 5,032,218 | A * | 7/1991 | Dobson | 203/40 |
| 5,052,486 | A * | 10/1991 | Wilson | 166/308.4 |
| 5,324,499 | A * | 6/1994 | Sturgeoff et al. | 423/531 |
| 5,348,390 | A * | 9/1994 | Schertenleib | 366/136 |
| 5,516,423 | A * | 5/1996 | Conoby et al. | 210/85 |
| 5,522,660 | A * | 6/1996 | O'Dougherty et al. | 366/136 |
| 5,523,518 | A | 6/1996 | Shikami et al. | |
| 6,533,838 | B1 * | 3/2003 | Yamamura et al. | 75/688 |
| 6,554,467 | B2 * | 4/2003 | Snyder et al. | 366/348 |
| 6,572,255 | B2 * | 6/2003 | Husher | 366/132 |
| 6,623,183 | B2 * | 9/2003 | Nakagawa et al. | 396/578 |
| 6,764,212 | B1 * | 7/2004 | Nitta et al. | 366/114 |
| 6,796,703 | B2 * | 9/2004 | Lemke | 366/152.4 |
| 7,360,550 | B2 * | 4/2008 | Inagaki | 137/3 |
| 2002/0034122 | A1 * | 3/2002 | Lemke | 366/136 |
| 2002/0108643 | A1 * | 8/2002 | Yasuda et al. | 134/107 |
| 2004/0052154 | A1 * | 3/2004 | Hiraoka et al. | 366/136 |
| 2004/0211464 | A1 * | 10/2004 | Inagaki | 137/93 |
| 2006/0144446 | A1 * | 7/2006 | Inagaki | 137/561 R |

FOREIGN PATENT DOCUMENTS

| | | |
|---|---|---|
| JP | 58-146527 | 9/1983 |
| JP | 05-057271 | 3/1993 |
| JP | 06-183704 | 7/1994 |
| JP | 08-091811 | 4/1996 |
| JP | 11-204486 | 7/1999 |
| JP | 2000-117086 | 4/2000 |
| JP | 2000-164550 | 6/2000 |
| JP | 2001-350879 | 12/2001 |
| JP | 2002-068715 | 3/2002 |
| JP | 2002-120890 | 4/2002 |
| JP | 2002-121798 A | 4/2002 |
| JP | 2002-303113 A | 10/2002 |

OTHER PUBLICATIONS

International Search Report mailed Mar. 16, 2004.
JPO Office Action, App. No. 2002-350372, Jan. 22, 2009 (2 pages).

* cited by examiner

METHOD FOR RECYCLING WASTE SULFURIC ACID

TECHNICAL FIELD

The present invention relates to apparatuses for recycling waste sulfuric acid.

BACKGROUND ART

Sulfuric acid is used in large quantities in various industries at grades (purity and concentration) required for these industries. In general, wasted sulfuric acid is subjected to the following processes:
(1) In situ treatment of wastewater (neutralization) generated in factories;
(2) Treatment of wastewater (neutralization) in recycling firms;
(3) Reuse as a neutralizer in factories;
(4) Recycling (distillation purification) in factories or in recycling firms; and
(5) Treatment for reuse as a raw material of alum (or aluminum sulfate) in specialized firms.

Among them, case (1) is most common. In this case, a large amount of alkaline chemical (calcium hydroxide) and various wastewater treatment agents (e.g. an inorganic flocculant, a polymer flocculant, and a hydrogen peroxide decomposition accelerator) are required. Thus, large amounts of sludge and wastewater are generated. This is undesirable from the viewpoints of environmental and resource aspects. Case (2) is similar to case (1) although the waste sulfuric acid is treated outside factories. Since large amounts of sludge and wastewater are also generated, case (2) is undesirable from the viewpoints of environmental and resource aspects. In case (3), since the demand for waste sulfuric acid as a neutralizer is low, the surplus waste sulfuric acid must be treated as in case (1) or (2). Consequently, this is not satisfactory. Case (4) requires a large-scale plant and energy for recycling waste sulfuric acid and causes many industrial problems such as energy, cost, site space, safety, and handling. Therefore, case (4) is rarely used. In case (5), since waste sulfuric acid is seldom treated as a valuable resource, typically, recycling firms charge for services or buy it at very low prices (at most a few yen/Kg). In this case, the usage rate of waste sulfuric acid is usually equal to or less than 10 mass percent. This rate should be increased.

Since the added value of waste sulfuric acid in the above-mentioned process is low, conventionally, waste sulfuric acid is generally recycled in factories using sulfuric acid or recycling firms with recycling charges. For example, waste sulfuric acid generated in semiconductor plants usually contains several tenths of a percent to several percent of hydrogen peroxide. Therefore, the waste sulfuric acid is treated (neutralization) or is used as a neutralizer in these plants. In some cases, the waste sulfuric acid is used at sites other than the plants as a raw material for aluminum sulfate. Even if the waste sulfuric acid is recycled, the use is limited to cascade utilization (simply as an alternate of industrial-grade sulfuric acid) that has a significantly lower added value. As a result, a method and an apparatus for effectively recycling waste sulfuric acid in any manufacturing factory or firm as a raw material having a high added value are awaited.

It is an object of the present invention to provide a recycling apparatus for changing waste sulfuric acid into recycled sulfuric acid having a high added value in an industrially profitable manner.

DISCLOSURE OF INVENTION

The inventors have conducted intensive research to accomplish the above-mentioned object and have made a recycling apparatus of waste sulfuric acid for collecting waste sulfuric acid generated at a source site A, transporting it by a carrier B, and recycling it for reuse at a user site C. The recycling apparatus of waste sulfuric acid includes a receiving tank for receiving virgin sulfuric acid (a) and waste sulfuric acid (b) having a concentration different from that of the virgin sulfuric acid, and includes (1) a mixer alone, (2) a mixer and a concentration monitor, or a mixer and a cooler in combination, or (3) a mixer, a concentration monitor, and a cooler in combination. The inventors have also found that the recycling apparatus can effectively recycle waste sulfuric acid in an industrially profitable manner; that the recycled sulfuric acid by the apparatus has a high added value and can be reused as a raw material for various industrial products, not reused as a neutralizer at downstream disposal sites; and that the apparatus can reduce the environmental load. Thus, the inventors have also found that the above-mentioned outstanding disadvantages can be completely solved.

The inventors have further studied to complete the invention based on such findings.

The present invention relates to:

(1) a recycling apparatus of waste sulfuric acid for collecting waste sulfuric acid generated at a source site A, transporting it by a carrier B, and recycling it for reuse at a user site C; the recycling apparatus of sulfuric acid including a receiving tank for receiving virgin sulfuric acid (a) and waste sulfuric acid (b) having a concentration different from that of the virgin sulfuric acid, and including (1) a mixer alone, (2) a mixer and a concentration monitor, or a mixer and a cooler in combination, or (3) a mixer, a concentration monitor, and a cooler in combination;

(2) the recycling apparatus of waste sulfuric acid according to aspect (1), wherein the receiving tank has the same or different inlets for receiving the virgin sulfuric acid (a) and the waste sulfuric acid (b) having a concentration different from that of the virgin sulfuric acid, and the recycling apparatus of waste sulfuric acid further including a circulation system for mixing the virgin sulfuric acid (a) and the waste sulfuric acid (b); and (3) the recycling apparatus of waste sulfuric acid according to aspect (2), wherein the circulation system further has a cooler.

The present invention also relates to:

(4) the recycling apparatus of waste sulfuric acid according to aspect (1), wherein the concentration of sulfuric acid in the waste is 50 to 90 mass percent and the concentration of the virgin sulfuric acid is 70 mass percent or more;

(5) the recycling apparatus of waste sulfuric acid according to aspect (1), wherein the source site A is a factory or firm for manufacturing semiconductors;

(6) the recycling apparatus of waste sulfuric acid according to aspect (1), wherein the carrier B is a vehicle or a ship; and (7) the recycling apparatus of waste sulfuric acid according to aspect (1), wherein the user site C is a factory or firm for manufacturing electrical and electronic products.

The present invention further relates to:

(8) the recycling apparatus of waste sulfuric acid according to aspect (1) further including a mixing vessel for mixing (i) the mixture of virgin sulfuric acid and waste sulfuric acid with (ii) a hydrogen peroxide solution and/or water;

(9) a method for reusing waste sulfuric acid by recycling the waste sulfuric acid with the recycling apparatus of sulfuric acid according to aspect (1);

(10) recycled sulfuric acid with the recycling apparatus of waste sulfuric acid according to aspect (1); and (11) the use of the recycled sulfuric acid according to aspect (10) for manufacturing industrial products.

BEST MODE FOR CARRYING OUT THE INVENTION

The present invention relates to a recycling apparatus of waste sulfuric acid for collecting waste sulfuric acid generated at a source site A, transporting it by a carrier B, and recycling it for reuse at a user site C. The recycling apparatus of waste sulfuric acid includes a receiving tank for receiving virgin sulfuric acid (a) and waste sulfuric acid (b) having a concentration different from that of the virgin sulfuric acid, and includes (1) a mixer alone, (2) a mixer and a concentration monitor, or a mixer and a cooler in combination, or (3) a mixer, a concentration monitor, and a cooler in combination.

Particularly, the apparatus according to the present invention can be used in a system for collecting the waste sulfuric acid generated at the source site A, transporting it by the carrier B, and recycling it for reuse at the user site C. The source site A means any place where waste sulfuric acid is generated. Examples of the source site A include various industrial factories and firms. Examples of the industrial fields include electric and electronics including semiconductors, steel, chemicals (e.g. inorganic chemicals, organic chemicals, or drugs), textile, fertilizer, metal, mining, paper, soda chemicals, machinery, battery, and neutralized gypsum industries. Preferable examples of the source site A according to the present invention are factories or firms where a large amount of waste sulfuric acid is generated. Specifically, manufacturing factories or firms in electrical and electronic industries and chemical industries such as inorganic chemicals, organic chemicals, and drugs are more preferable. Semiconductor manufacturing factories or firms are most preferable.

The waste sulfuric acid includes any material containing a compound represented by $H_2SO_4$. The waste sulfuric acid may contain impurities or may not contain any impurities at all. In the present invention, preferably, the amounts of the impurities in the waste sulfuric acid are low. Specifically, sulfuric acid containing about 1 ppm or less of heavy metal and about 10 ppm or less of chloride is more preferable. Sulfuric acid containing about 100 ppb or less of heavy metal and about 1 ppm or less of chloride is most preferable. The concentration of sulfuric acid in the waste is not limited within the scope of the object of the present invention. The concentration of sulfuric acid in the waste may range from above 0 to 100 mass percent. In the present invention, a high concentration of sulfuric acid in the waste is preferable. Specifically, the concentration of sulfuric acid in the waste of about 50 to 90 mass percent is more preferable, and about 60 to 90 mass percent is most preferable.

The carrier B means any transporter that can transport waste sulfuric acid, for example, pipelines, vehicles, ships, and aircrafts. Examples of the vehicles include all vehicles that travel on land; i.e. trains (e.g. freight trains), electric trains (e.g. super-express railways), and cars (e.g. tank lorries, tracks, and drug container carriers). Examples of the ships include all ships that sail on water; i.e. tankers, ferryboats, and boats. Examples of the aircrafts include all aircrafts that fly in the air; i.e. jumbo jet aircrafts, cargo airplanes, light airplanes, seaplanes, and air balloons. Preferably, the carrier B according to the present invention has wide capability of transportation; specifically, the vehicles and ships are more preferable; and the tank lorries, tracks, and drug container carriers are most preferable.

Virgin sulfuric acid used in the present invention is purified sulfuric acid including concentrated sulfuric acid and diluted sulfuric acid. Examples of the virgin sulfuric acid include sulfuric acid of an electric industrial grade, drug grade, reagent grade, industrial grade, and purified grade. Preferably, the virgin sulfuric acid according to the present invention is inexpensive and has uniform quality, and also can be used with the waste sulfuric acid. Sulfuric acid of electronic industrial grade, reagent grade, or purified grade is more preferable, and sulfuric acid of electronic industrial grade and reagent grade is most preferable. The grades represent purified sulfuric acids obtained by purifying waste sulfuric acids used in the respective industrial fields by known processes. Preferably, the concentration of virgin sulfuric acid according to the present invention is about 70 mass percent or more; more preferably, about 75 to 98 mass percent; and most preferably, about 80 to 98 mass percent. In the present invention, commercially available virgin sulfuric acid may be used. Such virgin sulfuric acid is available as a trade name of sulfuric acid through Sumitomo Chemical Co., Ltd. located in Chuo-ku, Tokyo.

In the present invention, any receiving tank can be used for receiving virgin sulfuric acid (a) and waste sulfuric acid (b) having a concentration different from that of the virgin sulfuric acid. The receiving tank may receive virgin sulfuric acid and waste sulfuric acid from the same inlet or the respective inlets. Examples of the receiving tank include a tank, container, case, can, and bottle. Preferably, the receiving tank according to the present invention is not deformed by receiving liquid. More preferably, the material of the receiving tank is not modified by acid. Most preferably, the material of the receiving tank is not degraded or not readily degraded by sulfuric acid. In the present invention, a plurality of receiving tanks may be used.

In the present invention, any mixer can be used for mixing virgin sulfuric acid and waste sulfuric acid. A known mixer may be used. Examples of the mixer include a rotary-vessel-type mixer, mechanical agitator, fluid agitator, and non-agitating type mixer. In an example of the rotary-vessel-type mixer, a container itself rotates and/or vibrates for mixing. The mechanical agitator having, for example, an impeller or a circulating pump for agitating and mixing is used. The mechanical agitator may be a line mixer. The fluid agitator, for example, utilizes an agitating and mixing means using air or gas. The non-agitating type mixer, for example, utilizes interflow or utilizes flow splitting of gravity flow with a splitting board or tube. In the present invention, the circulation system preferably performs the mixing.

In the present invention, any concentration monitor can be used for measuring the concentration of sulfuric acid. Known monitors may be used. For example, concentration monitors utilizing one or more means such as refractometry, neutralization titration, determination of moisture (e.g. Karl Fischer's method or evaporated residue method), ultrasonic (sound velocity) method, absorption spectrophotometry, hydrometry (densitometry), viscometry, pH titration, and potentiometry may be used. In the present invention, the concentration monitor utilizes one or more means selected from the group consisting of ultrasonic (sound velocity) method, (vibratory) densitometry, refractometry, hydrometry, pH titration, and absorption spectrophotometry is preferable from the viewpoints of speed and precision in measurement, cost and size of the monitor, and easiness in handling. The concentration monitor may be a portable type. In the present invention, a plurality of concentration monitors may be used. Such concentration monitors can be used at a plurality of sites. The concentration monitor may be used in factories or firms (source A) where waste sulfuric acid is generated, or may be used in the carrier B that transports waste sulfuric acid. The concentration monitor can be used everywhere in the factories or firms where waste sulfuric acid is generated. The concentration monitor can detect a change in concentration when waste sulfuric acid and virgin sulfuric acid are mixed.

In the present invention, any cooler can be used for cooling a mixture of waste sulfuric acid and virgin sulfuric acid. The cooler may utilize a known cooling means. For example, an air conditioner can be used. Examples of the known cooling means include cooling with liquid coolant such as water, ice water, or liquid nitrogen, cooling with solid coolant such as ice or dry ice, and spontaneous cooling (including circulating air cooling). In the present invention, a cooler using the liquid coolant is preferable. A cooler using water is more preferable. The cooler may be provided to any of a circulating pipe, a tank, and a mixing vessel. Most preferably, the cooler is provided to the circulating pipe. The cooler can suppress an increase in temperature due to hydration during mixing sulfuric acid of different concentrations.

Preferably, the recycling apparatus according to the present invention further includes at least one selected from the group consisting of a pump, a pipe, a valve, and a mixing vessel. Any pump can be used for charging and discharging liquid or gas by pressure. For example, known pumps such as reciprocating pumps, rotary pumps, centrifugal pumps, axial-flow pumps, and jet pumps may be used. Regarding the pipe, any tubular pipe can be used. For example, known pipes such as metal pipes, plastic pipes, rubber pipes, and pottery pipes may be used. Any valves can be used for regulating the direction of charging-discharging or flow of gas or liquid in the pipe. The pipe may be any known pipe. Any mixing vessel can be used for mixing (i) the mixture of virgin sulfuric acid and waste sulfuric acid with (ii) the hydrogen peroxide solution and/or water. Any known mixing vessel such as a tank, a container, a case, a can, and a bottle may be used. In the present invention, the concentration of sulfuric acid in the mixture of virgin sulfuric acid and waste sulfuric acid is preferably adjusted in the mixing vessel depending on the requirement by the user C. More preferably, a hydrogen peroxide solution and/or water are used as a diluent for adjusting the concentration. Most preferably, a hydrogen peroxide solution or water is used alone as a diluent for adjusting the concentration.

In the present invention, the recycling apparatus of waste sulfuric acid can be manufactured by providing a receiving tank for receiving both virgin sulfuric acid (a) and waste sulfuric acid (b) having a concentration different from that of the virgin sulfuric acid; and by providing the tank with (1) a mixer alone, (2) a mixer and a concentration monitor, or a mixer and a cooler in combination, or (3) a mixer, a concentration monitor, and a cooler in combination. The recycling apparatus of waste sulfuric acid is suitable for the use in a system for collecting waste sulfuric acid generated at a source site A, transporting it by a carrier B, and recycling it for reuse at a user site C.

Such apparatus may be installed at any of the source site A, the carrier B, and the user site C, preferably, at the user site C.

Preferred embodiments of the present invention will now be described with reference to the drawings.

Figure 1:
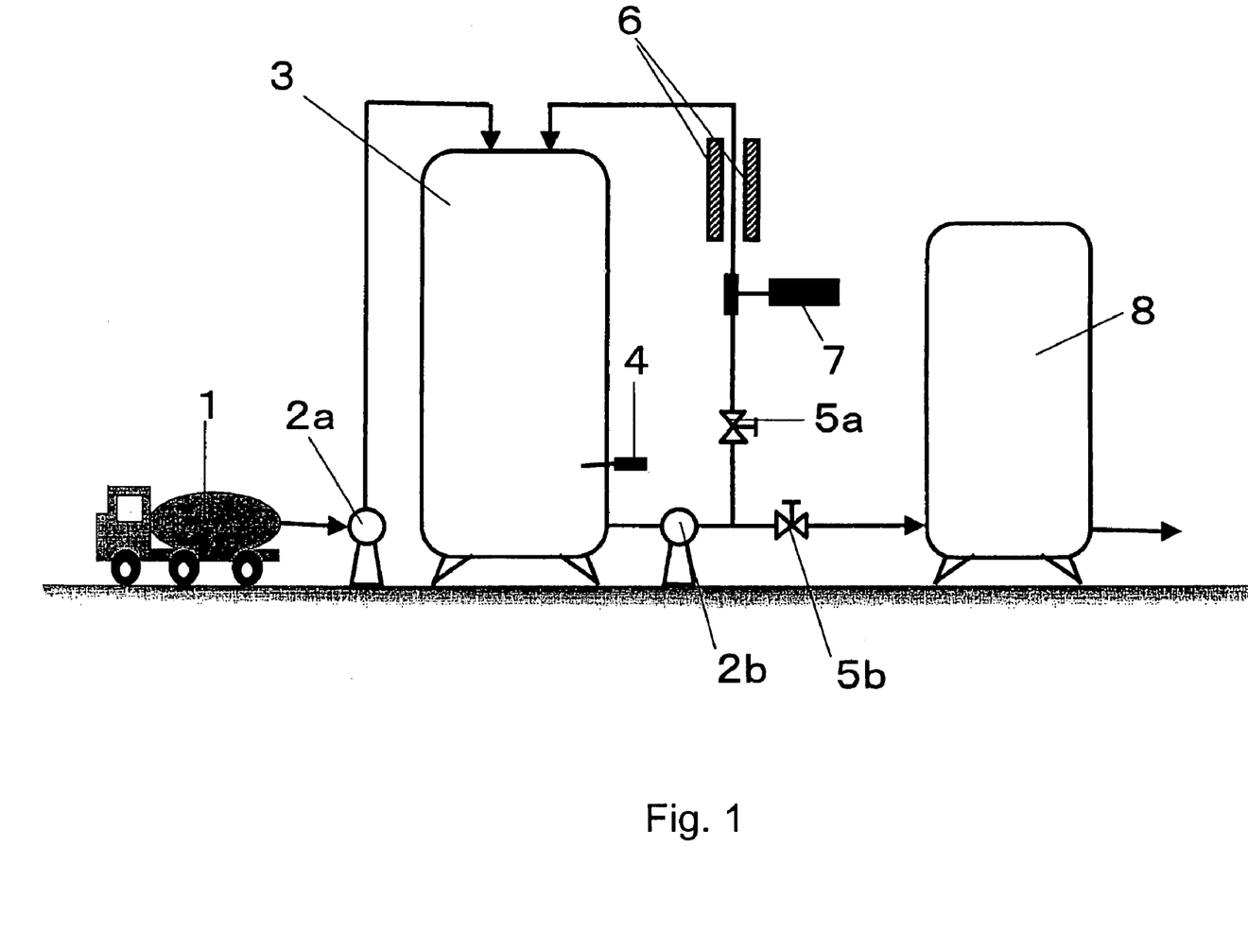
FIG. 1 shows a preferred embodiment of a recycling apparatus of waste sulfuric acid, wherein one receiving tank receives waste sulfuric acid and virgin sulfuric acid.

FIG. 1 shows a recycling apparatus of waste sulfuric acid including a receiving tank 3, pumps 2a and 2b, valves 5a and 5b, a concentration monitor 7, a cooler 6, and a vessel 8. In this recycling apparatus of waste sulfuric acid, one receiving tank receives both waste sulfuric acid and virgin sulfuric acid. The concentration of the virgin sulfuric acid used in the recycling apparatus of waste sulfuric acid shown in FIG. 1 is preferably from about 80 to 100 mass percent, more preferably from about 85 to 99.9999 mass percent, and most preferably from about 95 to 99 mass percent. The concentration of sulfuric acid in the waste used in the recycling apparatus of waste sulfuric acid shown in FIG. 1 is preferably from about 0 to 99 mass percent, more preferably from about 40 to 99 mass percent, and most preferably from about 60 to 99 mass percent.

In FIG. 1, the pump 2a and the receiving tank 3 are connected with a pipe. The receiving tank 3 can receive waste sulfuric acid transported by a carrier 1 using the pump 2a, and can also receive virgin sulfuric acid using the pump 2a. The receiving tank 3 is provided with a thermometer 4. The receiving tank 3, the pump 2b, the valves 5a and 5b, and the vessel 8 are connected with pipes. These connections structure a circulation system. The waste sulfuric acid and the virgin sulfuric acid in the receiving tank 3 circulate in the circulation system by actuating the pump 2b, opening the valve 5a, and closing the valve 5b. Thus, the waste sulfuric acid and the virgin sulfuric acid can be thoroughly mixed. The cooler 6 and the concentration monitor 7 are provided on the pipe from the valve 5a to the receiving tank 3 for cooling and measuring of the concentration during the mixing process. When the thermometer 4 reads a temperature higher than a predetermined level, the circulating solution is cooled through the cooler 6. In the present invention, the thermometer 4 and the cooler 6 may be automatically controlled by a CPU or the like. The predetermined temperature may depend on the type of the receiving tank.

When the concentration monitor 7 indicates a predetermined concentration of sulfuric acid, the valve 5b is opened and the valve 5a is closed. Thus, the solution mixture of the waste sulfuric acid and the virgin sulfuric acid passes through the valve 5b and enters the vessel 8. The predetermined concentration may depend on the purposes of reuse of the waste sulfuric acid. In the present invention, the concentration of sulfuric acid indicated by the concentration monitor 7 is preferably used as a reference for determination of amounts of reagents and water to be supplied. After the mixing in the circulation system, the concentration of sulfuric acid may be adjusted in the vessel 8, if necessary. When the concentration of sulfuric acid is higher than a predetermined level, the sulfuric acid mixture is diluted with a hydrogen peroxide solution and/or water. The amount of the hydrogen peroxide solution and/or water added for the dilution is preferably calculated based on data provided by the concentration monitor in the circulation system. When the diluent is added, the solution mixture is preferably mixed with the hydrogen peroxide solution and/or water. Obviously, the vessel 8 functions as both a reservoir and a mixing vessel. In the present invention, the vessel 8 is preferably connected to a manufacturing line with pipes or the like.

Figure 2:
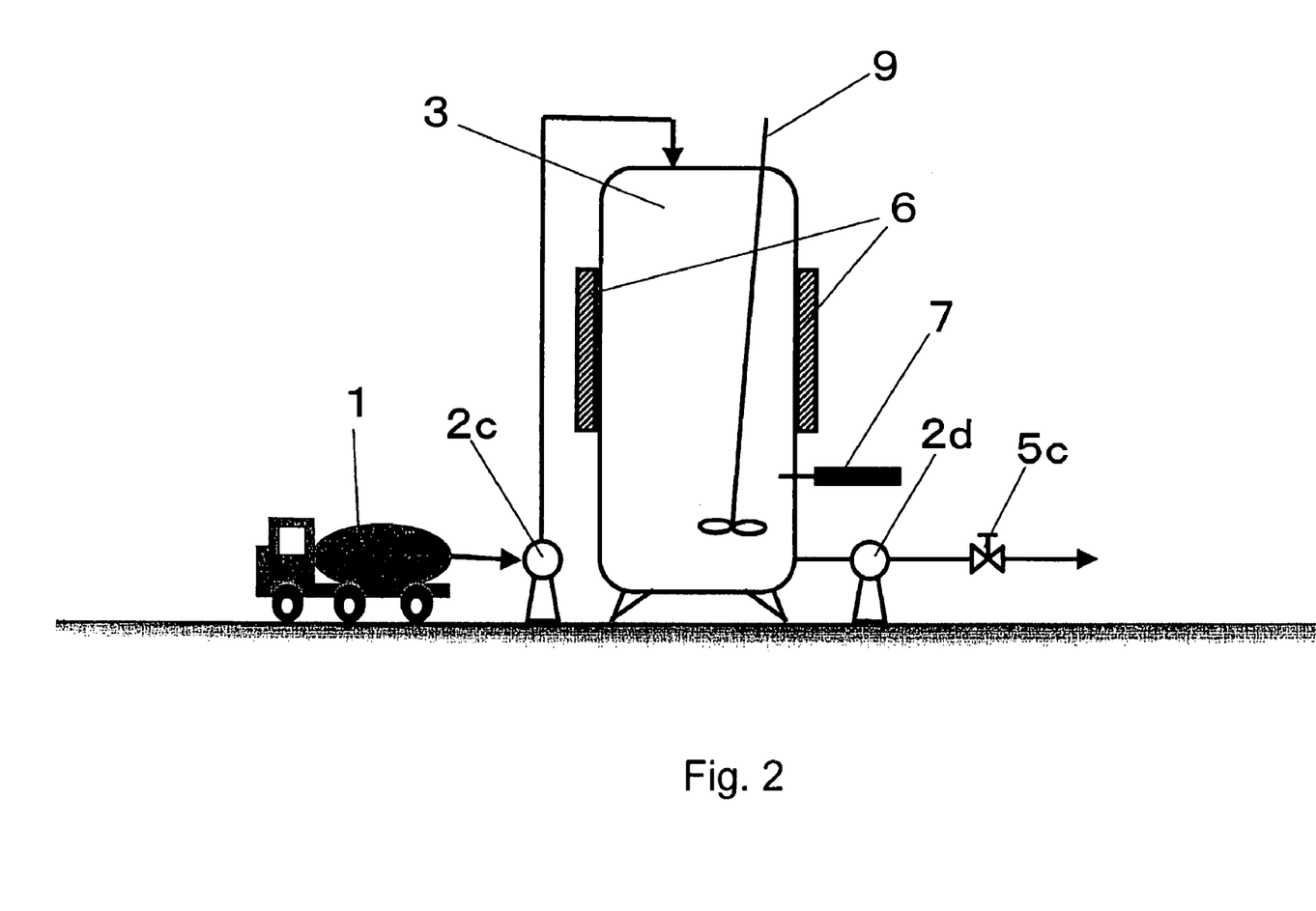
FIG. 2 shows a preferred embodiment of a recycling apparatus of waste sulfuric acid, wherein the receiving tank 3 for receiving waste sulfuric acid and virgin sulfuric acid is provided with a mixer.

FIG. 2 shows a recycling apparatus of waste sulfuric acid including a receiving tank 3, pumps 2c and 2d, a mixer 9, a cooler 6, a concentration monitor 7, and a valve 5c. This recycling apparatus of waste sulfuric acid is characterized in that the concentration monitor 7, the mixer 9, and the cooler 6 are provide to the receiving tank 3 for receiving waste sulfuric acid and virgin sulfuric acid. The concentration of the virgin sulfuric acid used in the recycling apparatus of waste sulfuric acid shown in FIG. 2 is similar to that in the case shown in FIG. 1. The concentration of sulfuric acid in the waste used in the recycling apparatus of waste sulfuric acid shown in FIG. 2 is generally about 80 mass percent or less.

In FIG. 2, the pump 2c and the receiving tank 3 are connected with a pipe. The receiving tank 3 can receive waste sulfuric acid transported by a carrier 1 using the pump 2c, and can also receive virgin sulfuric acid using the pump 2c. The receiving tank 3 is provided with the cooler 6, the concentration monitor 7, and the mixer 9. Therefore, the mixing by the mixer 9 can be performed in the receiving tank under cooling by the cooler 6 and measuring of the concentration of sulfuric acid by the concentration monitor 7. The receiving tank 3 and the valve 5c are connected with pipes. When the concentration monitor 7 indicates a sulfuric acid concentration higher than a predetermined concentration, the pump 2d is activated and the valve 5c is opened. Thus, the recycled waste sulfuric acid passes through the valve 5c and then is reused. The predetermined concentration is similar to that in the case shown in FIG. 1. In the present invention, the valve 5c is preferably connected to a manufacturing line of the user site C with pipes or the like.

Figure 3:
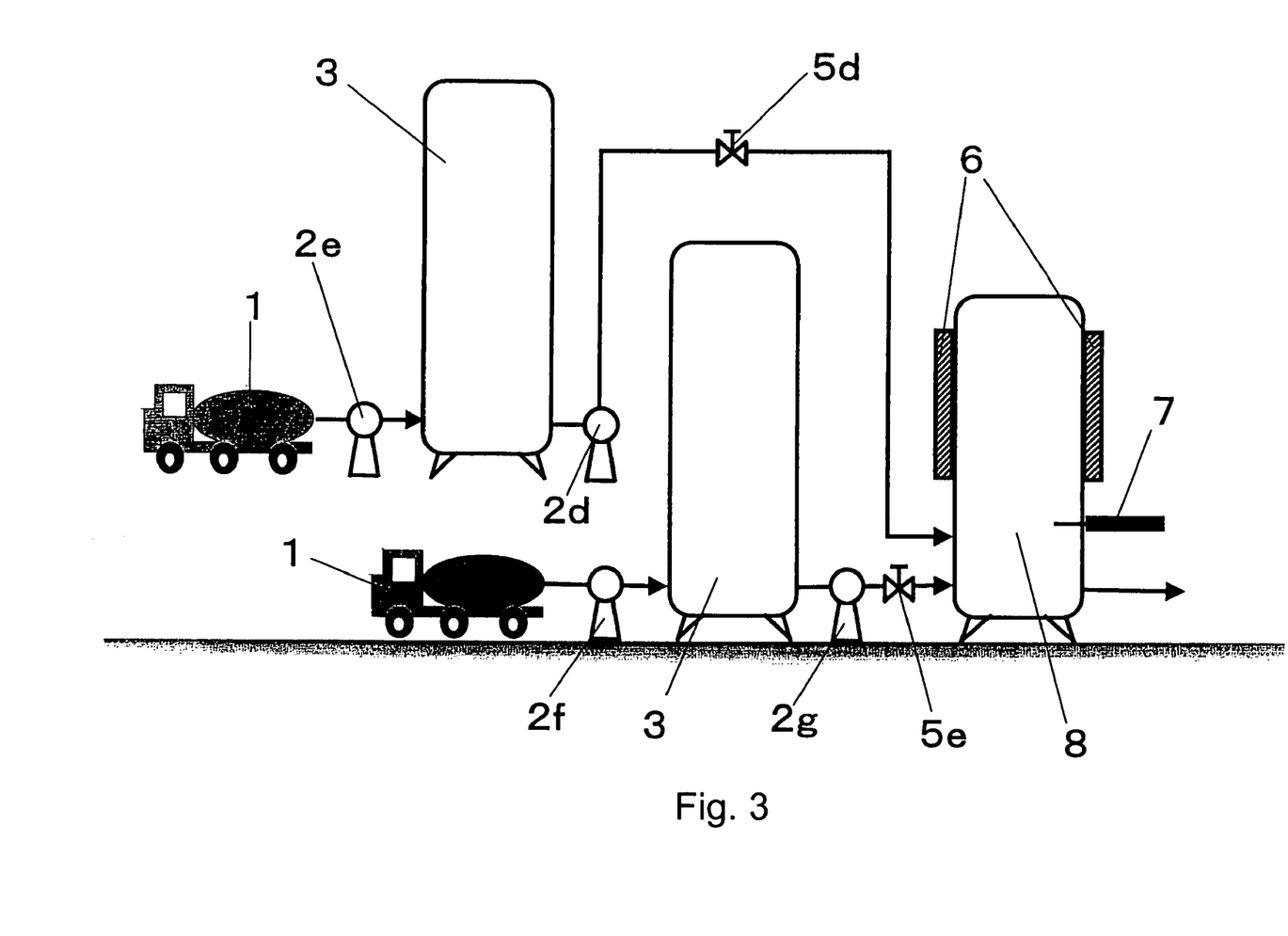
FIG. 3 shows a preferred embodiment of a recycling apparatus of waste sulfuric acid, wherein waste sulfuric acid and virgin sulfuric acid are received in the respective receiving tanks.

FIG. 3 shows a recycling apparatus of waste sulfuric acid including receiving tanks 3, pumps 2d, 2d, 2f, and 2g, pipes, valves 5d and 5e, a vessel 8, a cooler 6, and a concentration monitor 7. The recycling apparatus of waste sulfuric acid is characterized in that waste sulfuric acid and virgin sulfuric acid are received in the respective receiving tanks 3. The concentration of sulfuric acid in the waste and the concentration of the virgin sulfuric acid used in the recycling apparatus of waste sulfuric acid shown in FIG. 3 are similar to those in the case shown in FIG. 1. The concentration of sulfuric acid in the waste used in the recycling apparatus of waste sulfuric acid shown in FIG. 3 is similar to that in the case shown in FIG. 2.

In FIG. 3, the pumps 2e and 2d, one receiving tank 3, the valve 5d, and the vessel 8 are connected with pipes. The pumps 2f and 2g, the other receiving tank 3, the valve 5e, and the vessel 8 are connected with pipes. Waste sulfuric acid transported by a carrier 1 is received in the receiving tank 3 by activating the pump 2d, and then is received in the vessel 8 by opening the valve 5d and activating the pump 2d. Virgin sulfuric acid is received in the receiving tank 3 by activating the pump 2f, and then is received in the vessel 8 by opening the valve 5e and activating the pump 2g. In the present invention, the waste sulfuric acid and the virgin sulfuric acid are preferably mixed by interflow in the vessel 8. The vessel 8 is provided with the cooler 6 and the concentration monitor 7. The cooler 6 is activated by an increase in temperature, and the concentration monitor 7 monitors the concentration of sulfuric acid of the solution mixture. When the concentration of sulfuric acid reaches a predetermined concentration, the recycled sulfuric acid can be reused. The predetermined concentration is similar to that in the case shown in FIG. 1. In the present invention, the vessel 8 is preferably connected to a manufacturing line with pipes or the like. The vessel 8 functions as both a mixing vessel and a reservoir.

Figure 4:
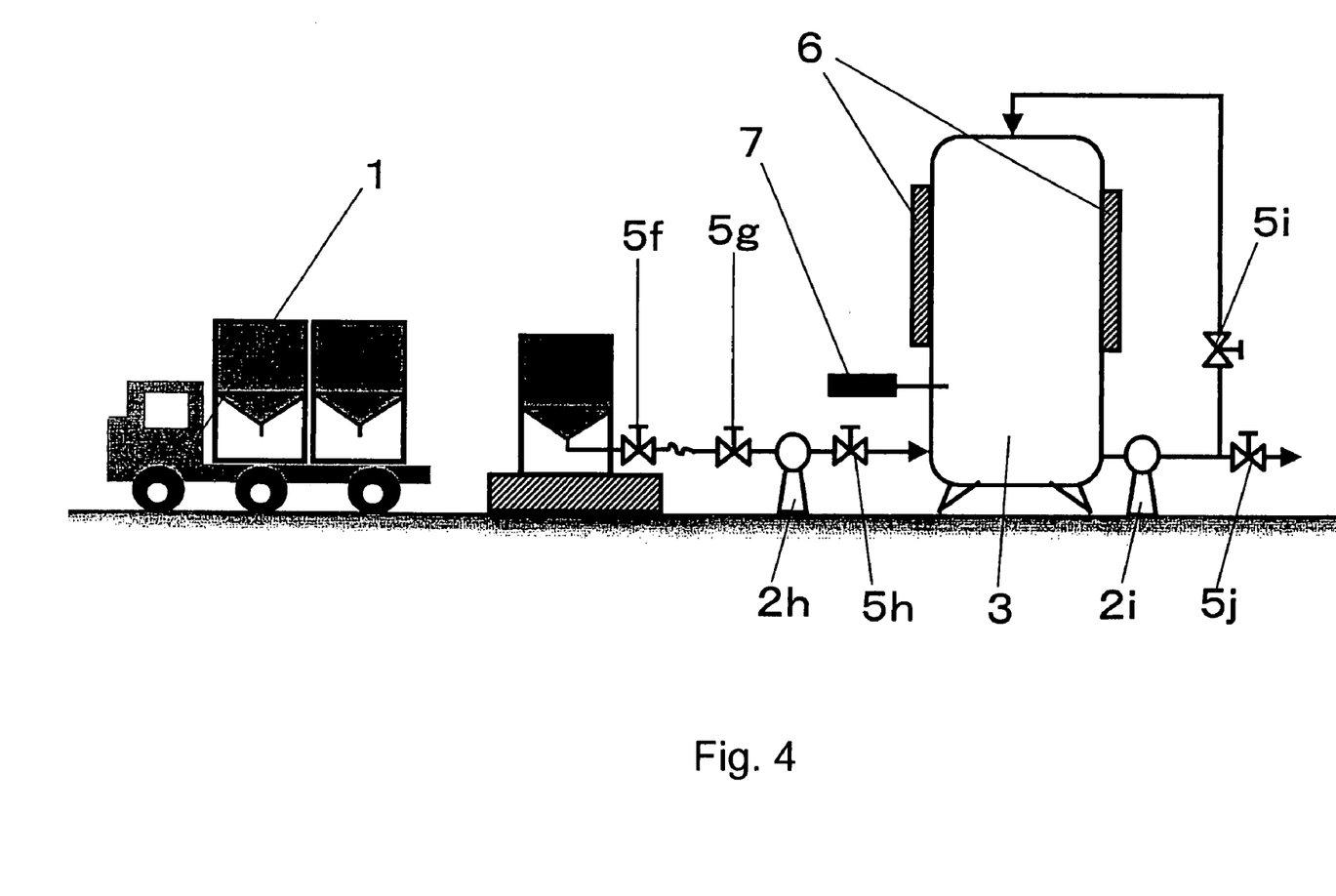
FIG. 4 shows a preferred embodiment of the recycling apparatus of waste sulfuric acid, wherein dedicated containers for waste sulfuric acid are distant from a receiving tank, waste sulfuric acid and virgin sulfuric acid are mixed in a circulation system, and the receiving tank 3 is provided with a cooler 6.

FIG. 4 shows a recycling apparatus of waste sulfuric acid including a receiving tank 3, pumps 2h and 2i, pipes, valves 5f, 5g, 5h, 5i, and 5j, a concentration monitor 7, and a cooler 6. This recycling apparatus of waste sulfuric acid is characterized in that waste sulfuric acid and virgin sulfuric acid are mixed by a circulation system and that the cooler 6 is provided to the receiving tank 3. The concentration of the virgin sulfuric acid and the concentration of sulfuric acid in the waste used in the recycling apparatus of waste sulfuric acid shown in FIG. 4 are similar to those in the case shown in FIG. 1.

In FIG. 4, the pump 2h, the valves 5f, 5g, and 5h, and the receiving tank 3 are connected with pipes. Waste sulfuric acid transported by a carrier 1 is received in the receiving tank 3 by activating the pump 2h and opening the valves 5f, 5g, and 5h. In this case, the waste sulfuric acid is transported by the carrier 1 having dedicated containers. Even if these containers are distant from the receiving tank, the valves 5f, 5g, and 5h, the pump 2h, and the receiving tank 3 can be connected with the pipes. Thus, the virgin sulfuric acid can be received in the receiving tank 3 by activating the pump 2h and opening the valves 5f, 5g, and 5h. The receiving tank 3, the pump 2i, and the valves 5i and 5j are connected with pipes to structure a circulation system. The waste sulfuric acid and the virgin sulfuric acid in the receiving tank 3 are circulated in the circulation system by activating the pump 2i, opening the valve 5i, and closing the valve 5j. Thus, the waste sulfuric acid and the virgin sulfuric acid are mixed by interflow. The receiving tank 3 is provided with the cooler 6 and the concentration monitor 7 for cooling and measuring the concentration of sulfuric acid. When the concentration monitor 7 indicates a predetermined concentration, the recycled sulfuric acid is discharged by closing the valve 5i and opening the valve 5j for reuse. The predetermined concentration is similar to that in the case shown in FIG. 1. In the present invention, the valve 5j is preferably connected to a manufacturing line of the user site C with pipes or the like.

The recycling apparatus of waste sulfuric acid is used for collecting waste sulfuric acid generated at the source site A, transporting it by the carrier B, and recycling it for reuse at the user site C, and for recycling the waste sulfuric acid.

The user site C means any place where the recycled sulfuric acid from the waste sulfuric acid can be used. Examples of the user site C include manufacturing factories or firms of various industrial fields; i.e. electric and electronics including cathode-ray tubes and substrates, steel, inorganic chemicals, organic chemicals, drugs, textile, fertilizer, metal, mining, paper, soda chemicals, machinery, battery, and neutralized gypsum industries. Preferable examples of the user site C according to the present invention are manufacturing factories or firms of electric and electronics, steel, inorganic chemicals, and organic chemicals industries. The electrical and electronic products manufacturing factories or firms are more preferable, and semiconductor manufacturing factories or firms are most preferable. Specifically, preferred examples of the user site C are substrate manufacturing factories (using etching solutions for copper foils), cathode-ray-tube manufacturing factories (using stripping solutions for photoresist masks), and plating factories. Substrate manufacturing factories using solution mixtures of sulfuric acid and a hydrogen peroxide solution as cleansing solutions or stripping solutions are more preferable. In the present invention, the recycled sulfuric acid is preferably used at the user site C for removing metals, stripping resists, etching substrates, or treating surfaces. More preferably, the recycled sulfuric acid is mixed with a hydrogen peroxide solution and optionally with water and the resulting mixtures are used as cleaning solutions or stripping solutions. Since wastewater is in unstable supply, it is most preferably that the recycled sulfuric acid be used with virgin sulfuric acid in consideration of its stable supply.

INDUSTRIAL APPLICABILITY

According to the present invention, a recycling apparatus of waste sulfuric acid for recycling waste sulfuric acid in an industrially effective manner and for supplying the recycled sulfuric acid having a high added value can be provided. Furthermore, the amount of wastewater treatment agents used for treating waste sulfuric acid can be reduced, and sludge and wastewater generated by the wastewater treatment can be decreased.

The invention claimed is:

1. A method for recycling waste sulfuric acid by collecting waste collecting waste sulfuric acid generated at a source site, transporting it by a carrier, and recycling it for reuse at a user site, comprising:
   receiving virgin sulfuric acid and waste sulfuric acid having a concentration different from that of the virgin sulfuric acid through a set of inlets;
   mixing the waste sulfuric acid and the virgin sulfuric acid to produce a mixture of the waste sulfuric acid and the virgin sulfuric acid;
   monitoring an acid concentration of the mixture of the waste sulfuric acid and the virgin sulfuric acid to determine when the acid concentration of the mixture reaches a predetermined acid concentration;
   adjusting the acid concentration of the mixture to reach the predetermined acid concentration.

2. A method for recycling waste sulfuric acid according to claim 1:
   wherein the set of inlets includes a first inlet receives the virgin sulfuric acid and a second inlet receives the waste sulfuric acid having an acid concentration different from that of the virgin sulfuric acid.

3. A method for recycling waste sulfuric acid according to claim 1, further comprising cooling said waste sulfuric acid and said waste sulfuric acid.

4. A method for recycling waste sulfuric acid according to claim 1, wherein the acid concentration of sulfuric acid in the waste is 50 to 90 mass percent and the acid concentration of the virgin sulfuric acid is 70 mass percent or more.

5. A method for recycling waste sulfuric acid according to claim 1, wherein the source site is a factory or firm for manufacturing semiconductors.

6. A method for recycling waste sulfuric acid according to claim 1, wherein the carrier is a vehicle or a ship.

7. A method for recycling waste sulfuric acid according to claim 1, wherein the user site is a factory or firm for manufacturing electrical and electronic products.

8. A method for recycling waste sulfuric acid according to claim 1 further comprising:
   mixing the mixture of virgin sulfuric acid and waste sulfuric acid with a hydrogen peroxide solution and/or water.

9. A method for reusing waste sulfuric acid by recycling the waste sulfuric acid with the method for recycling waste sulfuric acid according to claim 1.

* * * * *